United States Patent
Ono (10) Patent No.: US 6,812,882 B2
(45) Date of Patent: Nov. 2, 2004

(54) STATIONARY ON-ROAD OBJECT DETECTION METHOD FOR USE WITH RADAR

(75) Inventor: Daisaku Ono, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/276,832

(22) PCT Filed: Mar. 19, 2002

(86) PCT No.: PCT/JP02/02620
§ 371 (c)(1),
(2), (4) Date: Nov. 19, 2002

(87) PCT Pub. No.: WO02/075351
PCT Pub. Date: Sep. 26, 2002

(65) Prior Publication Data
US 2003/0076255 A1 Apr. 24, 2003

(30) Foreign Application Priority Data
Mar. 19, 2001 (JP) .......................... 2001-78761

(51) Int. Cl.$^7$ ............................................. G01S 13/93
(52) U.S. Cl. .......................... 342/70; 342/71; 342/114; 342/115
(58) Field of Search .............................. 342/70, 71, 72, 342/114, 115; 340/903, 435, 436; 701/301

(56) References Cited

U.S. PATENT DOCUMENTS

| | | | | |
|---|---|---|---|---|
| 5,268,692 A | * | 12/1993 | Grosch et al. | 342/70 |
| 6,018,308 A | * | 1/2000 | Shirai | 342/70 |
| 6,404,328 B1 | * | 6/2002 | Alland et al. | 340/435 |
| 2003/0076255 A1 | * | 4/2003 | Ono | 342/70 |

FOREIGN PATENT DOCUMENTS

| | | | |
|---|---|---|---|
| JP | 6-148329 A | | 5/1994 |
| JP | 8-82679 A | | 3/1996 |
| JP | 10-282220 A | | 10/1998 |
| JP | 11-38141 A | | 2/1999 |
| JP | 11-38142 A | | 2/1999 |
| JP | 11-72562 A | | 3/1999 |
| JP | 2002277537 A | * | 9/2002 |

OTHER PUBLICATIONS

"Lexluther: an algorithm for detecting roads and obstacles in radar images", Lakshmanan, S.; Kaliyaperumal, K.; Kluge, K.;Intelligent Transportation System, 1997 IEEE Conference on , Nov. 9–12, 1997 P:415–420.*

"An algorithm for detecting roads and obstacles in radar images", Kaliyaperumal, K.; Lakshmanan, S.; Kluge, K,; Vehicular Technology, IEEE Transactions on , vol.: 50 Issue: 1, Jan. 2001 P. 170–182.*

* cited by examiner

Primary Examiner—John B. Sotomayor
(74) Attorney, Agent, or Firm—Fogg & Associates, LLC; Laura A. Ryan (57) ABSTRACT

A method capable of determining whether a target detected by a radar is a stationary on-road object or not is disclosed, wherein a fluctuation in the reception level of a reflected wave from a target is obtained in relation to the distance of the target, a difference in reception level between a maximum point and a minimum point is obtained from the fluctuation of the reception level, and when the obtained difference is larger than a predetermined threshold value, it is determined that the target is a stationary on-road object. Further, slope over the distance between the maximum point and the minimum point is obtained, and when the obtained slope is greater than a predetermined threshold value, it is determined that the target is a stationary on-road object. Further, the distance between maximum points or between minimum points is obtained, and when the obtained distance is smaller than a predetermined threshold value, it is determined that the target is a stationary on-road object.

3 Claims, 12 Drawing Sheets

STATIONARY ON-ROAD OBJECT DETECTION METHOD FOR USE WITH RADAR

TECHNICAL FIELD

The present invention relates to a method, for use with a radar, for detecting a stationary on-road object other than a vehicle, for example, an object that has fallen off a traveling vehicle.

BACKGROUND ART

For vehicle-to-vehicle distance control, a vehicle-mounted radar system, which projects a radar beam forward and thereby detects an object such as a vehicle located in the path ahead, is used. Such a radar system can be an FM-CW radar system that uses radio waves such as millimeter waves or a system that use laser light. Using such a radar system, the distance and relative velocity with respect to the vehicle ahead and the accurate position of the vehicle ahead are detected to control the vehicle-to-vehicle distance.

A scanning radar scans a radar beam by moving the beam from left to right or from right to left, with small step angles, within a predetermined time. At each step angle, the radar-equipped vehicle projects a radar beam toward the vehicle traveling on the road ahead, and the reflected wave from the vehicle ahead is received and processed to detect the presence of the vehicle ahead and compute the distance and relative velocity with respect to that vehicle.

In the prior art, the target detected by the radar is examined to determine whether it is a vehicle traveling ahead or a structure such as a bridge or a road sign located above the road ahead, and when it is a vehicle traveling ahead, the detected target is set as a vehicle control target.

On the other hand, if the detected target is a stationary object, it may be a stationary object lying on the road ahead. There are various kinds of stationary objects that may be lying on the road; for example, the object may be an object, such as a cardboard box, that has fallen off a truck or a roadside billboard blown down by the wind. Such stationary on-road objects vary in size and shape; some are small enough that a vehicle can pass over them, and others are not. However, there are no set criteria for assessing the size, shape, etc. of such objects, and even when the stationary object located on the road ahead is one that a vehicle can pass over, the object is recognized as a vehicle control target, and control such as deceleration is performed, for example, in the case of vehicle-to-vehicle-control. One solution to this would be to exclude such stationary objects from control targets so that any of such targets would not be detected as a target, but there are stationary on-road objects that a vehicle cannot pass over; in that case, they cannot be excluded from the control targets.

It is accordingly an object of the present invention to provide a method for determining whether an object detected by a radar is a stationary on-road object, that is, the kind of on-road object that a vehicle cannot pass over. A scanning type radar or a non-scanning type radar may be used as the radar in the present invention.

DISCLOSURE OF THE INVENTION

According to a stationary on-road object detection method for a radar pursuant to the present invention, a fluctuation in the reception level of a reflected wave from a target is obtained in relation to the distance of the target, a difference in reception level between a maximum point and a minimum point is obtained from the fluctuation of the reception level, and when the obtained difference is larger than a predetermined threshold value, it is determined that the target is a stationary on-road object. In an alternative method, the slope over the distance between the maximum point and the minimum point is obtained, and when the obtained slope is greater than a predetermined threshold value, it is determined that the target is a stationary on-road object. In another alternative method, the distance between maximum points or between minimum points is obtained, and when the obtained distance is smaller than a predetermined threshold value, it is determined that the target is a stationary on-road object. The above detection methods may be combined.

Provisions are made to vary the threshold value for the difference and the threshold value for the slope in accordance with the distance of the target. Further, for the reception level, a filter constant is varied in accordance with relative velocity or actual vehicle speed.

A scanning type radar or a non-scanning type radar may be used as the radar in the present invention. In the description hereinafter given, an FM-CW radar is used, but the radar in the invention is not limited to the FM-CW radar.

ADVANTAGEOUS EFFECT OF THE INVENTION

According to the present invention, whether the detected target is a stationary on-road object that a vehicle cannot pass over can be determined based on the fluctuation of the reception level by using a simple method. This determination can be made based on the difference in value between a maximum point and a minimum point, the slope, or the distance between maximum points or between minimum points; an appropriate one of these methods can be selected. It is also possible to combine these methods; furthermore, as the threshold value is varied in accordance with the distance or relative velocity of the target, a more accurate determination can be made.

DETAILED DESCRIPTION OF THE INVENTION

Figure 1:
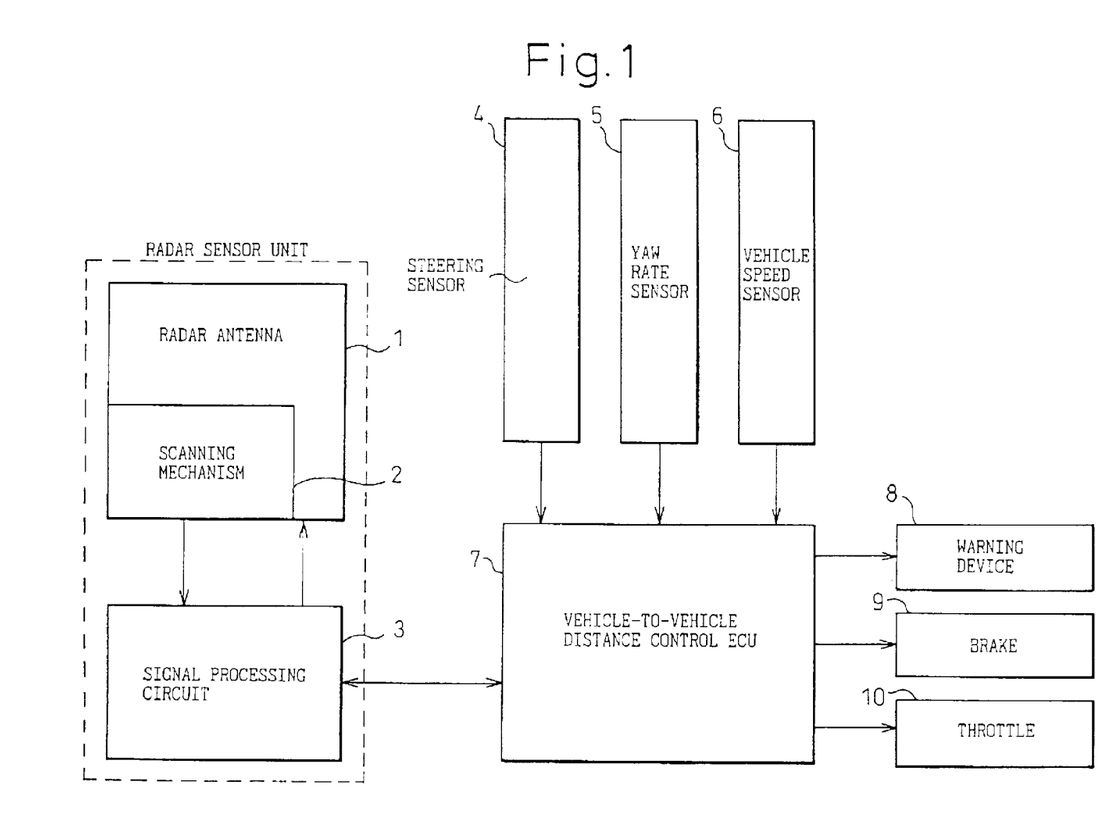
FIG. 1 is a diagram showing an overview of the configuration of a vehicle-to-vehicle distance control system that uses a radar.

FIG. 1 is a diagram showing an overview of the configuration of a vehicle-to-vehicle distance control system employing the method of the present invention. A radar sensor unit is, for example, an FM-CW radar, and includes a radar antenna 1, a scanning mechanism 2, and a signal processing circuit 3. A vehicle-to-vehicle distance control ECU 7 receives signals from a steering sensor 4, a yaw rate sensor 5, and a vehicle speed sensor 6 as well as from the signal processing circuit 3 in the radar sensor unit, and controls a warning device 8, a brake 9, a throttle 10, etc. The vehicle-to-vehicle distance control ECU 7 also sends a signal to the signal processing circuit 3 in the radar sensor unit.

Figure 2:
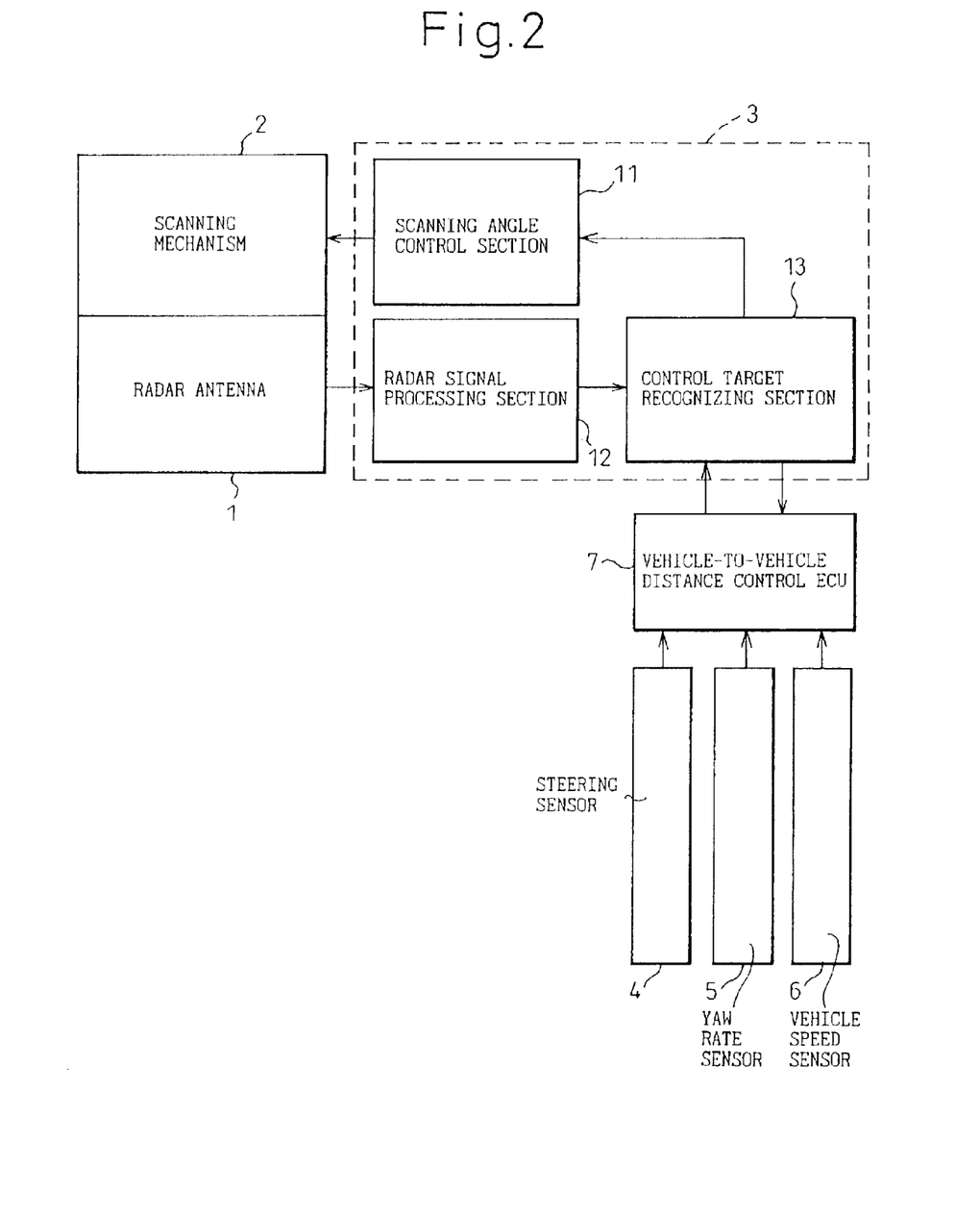
FIG. 2 is a diagram showing the configuration of a signal processing circuit 3 of FIG. 1.

FIG. 2 is a diagram showing the configuration of the signal processing circuit 3 of FIG. 1. The signal processing circuit 3 comprises a scanning angle control section 11, a radar signal processing section 12, and a control target recognizing section 13. The radar signal processing section 12 applies an FFT to the reflected signal received by the radar antenna 1, detects the power spectrum, computes the distance and relative velocity with respect to the target, and supplies the resulting data to the control target recognizing section 13. Based on the distance and relative velocity with respect to the target supplied from the radar signal processing section 12, and on the vehicle information detected by the steering sensor 4, yaw rate sensor 5, vehicle speed sensor 6, etc. and supplied from the vehicle-to-vehicle distance control ECU 7, the control target recognizing section 13 identifies the control target and supplies the result to the vehicle-to-vehicle distance control ECU 7 while, at the same time, providing the required scanning angle to the scanning angle control section 11. The scanning angle control section 11 is one that, in the case of a fixed type radar, controls the beam projection angle, etc. when the vehicle is traveling around a corner and, in the case of a scanning radar, controls the beam scanning angle. In response to the control signal from the scanning angle control section 11, the scanning control mechanism 2 performs scanning by sequentially projecting the beam at the required angle.

Figure 3:
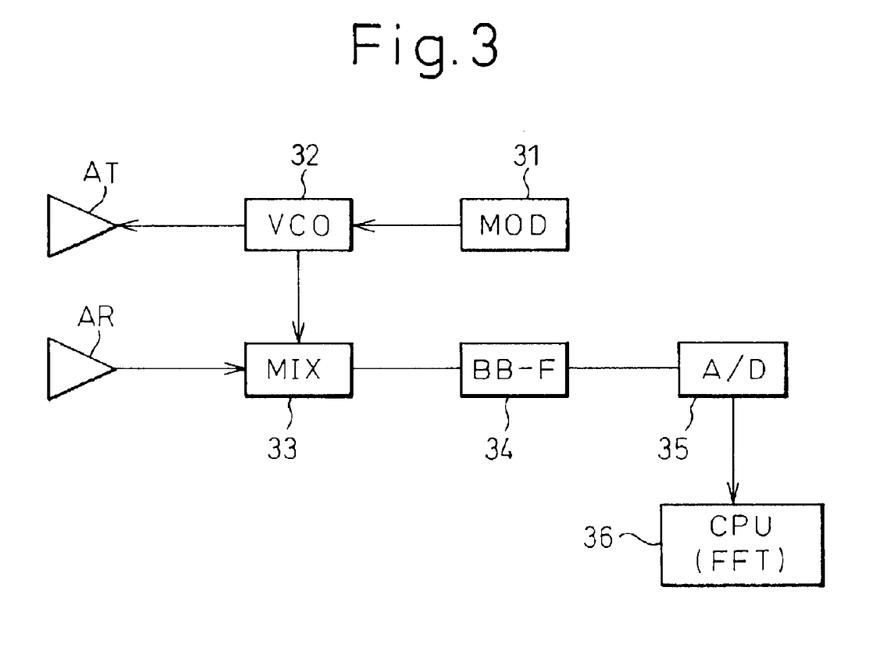
FIG. 3 is a diagram showing the configuration of an FM-CW radar as one example of the radar.

FIG. 3 is a diagram showing the configuration of a two-antenna FM-CW radar as one example of the FM-CW radar. As shown, a modulating signal generator 31 applies a modulating signal to a voltage-controlled oscillator 32 for frequency modulation, and the frequency-modulated wave is transmitted via a transmitting antenna AT, while a portion of the transmitted signal is separated and directed into a frequency converter 33 which functions as a mixer. The signal reflected from a target, such as a vehicle traveling ahead, is received via a receiving antenna AR, and the received signal is mixed in the frequency converter with the output signal of the voltage-controlled oscillator 32 to produce a beat signal. The beat signal is passed through a baseband filter 34, and is converted by an A/D converter 35 into a digital signal; the digital signal is then supplied to a CPU 36 where signal processing, such as applying a fast Fourier transform, is performed on the digital signal to obtain the distance and relative velocity of the target.

A description will be given, below, of how a stationary on-road object is detected by the radar in the vehicle-to-vehicle distance control system shown in FIGS. 1 and 2.

Figure 4:
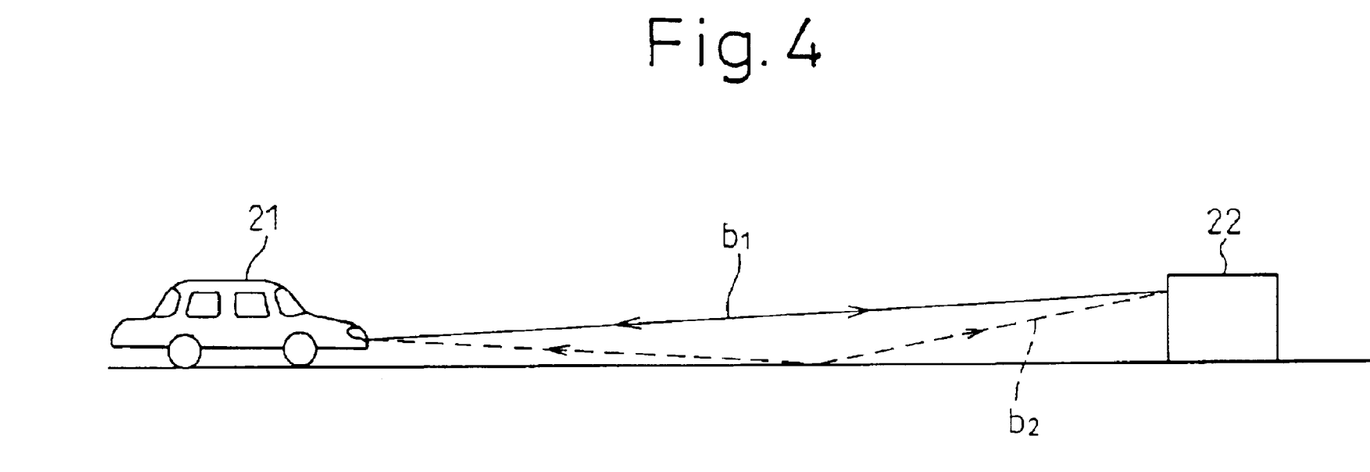
FIG. 4 is a diagram showing how beams emitted from a vehicle arrive at and are reflected from a stationary object when the stationary object is lying on the road.

FIG. 4 is a diagram showing how beams $b_1$ and $b_2$ emitted from a vehicle 21 arrive at and are reflected from a stationary object 22 when the stationary object is lying on the road. If the height of the stationary object 22 is relatively large, a phenomenon called multipath reflection occurs. As shown in FIG. 4, the beam b1 arrives directly at the stationary object 22 and is reflected directly from it, while the beam b2 arrives at the stationary object after being reflected by the road surface and is returned via the same path; in this way, multipath reflection occurs and the two beams arrive back via separate paths.

Figure 5:
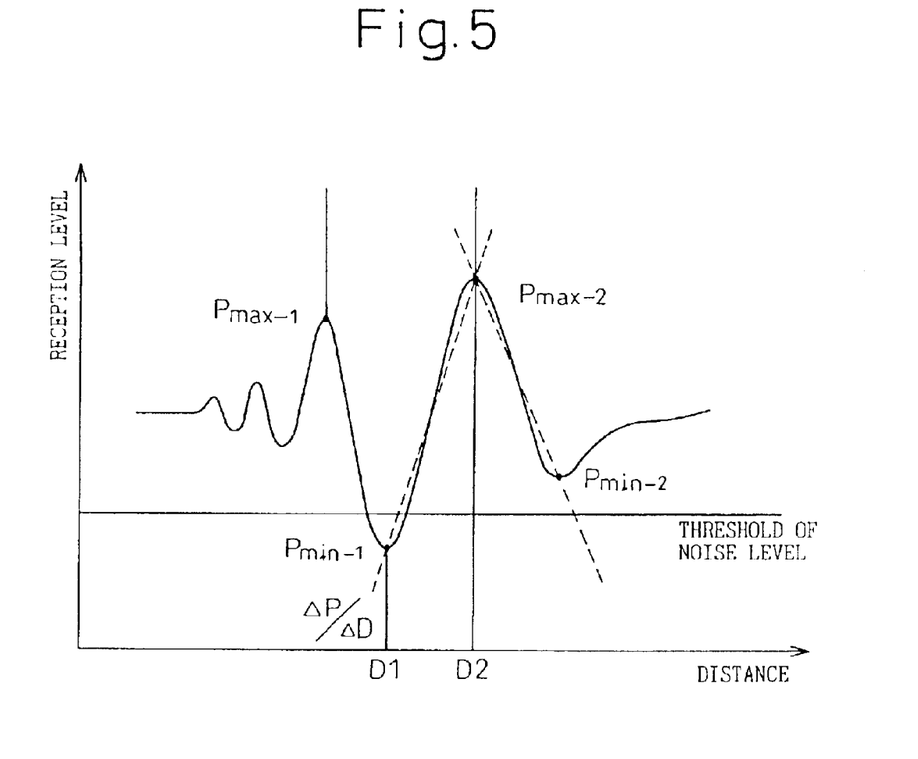
FIG. 5 is a graph showing how the reception level of the reflected radar signal varies with the distance between the vehicle and the stationary on-road object when the size of the object is large enough to cause multipath reflections.

FIG. 5 shows how the reception level of the reflected radar signal varies with the distance between the vehicle and the stationary on-road object when the size of the object is large enough to cause multipath reflections. In FIG. 5, the distance from the vehicle to the object is plotted along the abscissa, and the reception level along the ordinate. When multipath reflections occur, the reception level fluctuates greatly as shown, and when the size of the stationary object is large, the fluctuation in the reception level is also large. Accordingly, whether the size of the stationary object is large or not can be determined based on the magnitude of the fluctuation. Utilizing this, the present invention judges the size of the stationary object in the following way.

<Judging the Size from the Difference Between Maximum Value and Minimum Value>

As shown in the graph of FIG. 5, when multipath reflections occur, the reception level fluctuates, exhibiting maximum points Pmax-1, Pmax-2, etc. and minimum points Pmin-1, Pmin-2, etc. Here, the difference, for example, between the value at the maximum point Pmax-2 and the value at the minimum point Pmin-1 is obtained, and when this difference is larger than a predetermined value (threshold value), that is, when $$P\text{max-2} - P\text{min-1} > \Delta P \text{(threshold value)}$$

it is determined that the fluctuation of the level is large, and therefore that the detected stationary object is a large stationary on-road object, that is, the kind of on-road object that the vehicle cannot pass over. Here, the difference may be obtained using the maximum point and minimum point obtained at the time of the detection, or the maximum point and minimum point may be selected from among the maximum points and minimum points obtained after traveling a given distance as shown in FIG. 5. This also applies to the embodiment given hereinafter.

<Judging the Size from Slope Over Distance when Reception Level Changes from Maximum Point to Minimum Point or From Minimum Point to Maximum Point>

When multipath reflections occur, the reception level fluctuates, and the slope over the distance when the level changes from a maximum point to a minimum point or from a minimum point to a maximum point becomes steeper. In view of this, in FIG. 5, the slope over the distance, for example, when the level changes from Pmin-1 to Pmax-2 (D1→D2) is obtained, and when this slope is greater than a predetermined value (threshold value), that is, when $$(P\text{max-2} - P\text{min-1})/(D2 - D1) > \Delta(P/D) \text{ (threshold value)}$$

it is determined that the fluctuation of the level is large, and therefore that the detected stationary object is a large stationary on-road object. Here, the slope of the reception level from D1 to D2 was obtained, but alternatively, the maximum point and minimum point obtained at the time of the detection may be used.

<Judging the Size from both Difference and Slope>

When the above difference is larger than the predetermined value (threshold value), that is, when $$P\text{max-2}-P\text{min-1} > \Delta P$$

and when the above slope is greater than the predetermined value (threshold value), that is, when $$(P\text{max-2}-P\text{min-1})/(D2-D1) > \Delta(P/D)$$

it is determined that the fluctuation of the level is large, and therefore that the detected stationary object is a large stationary on-road object.

<Judging the Size from Distance Between Maximum Points or Between Minimum Points>

Figure 6:
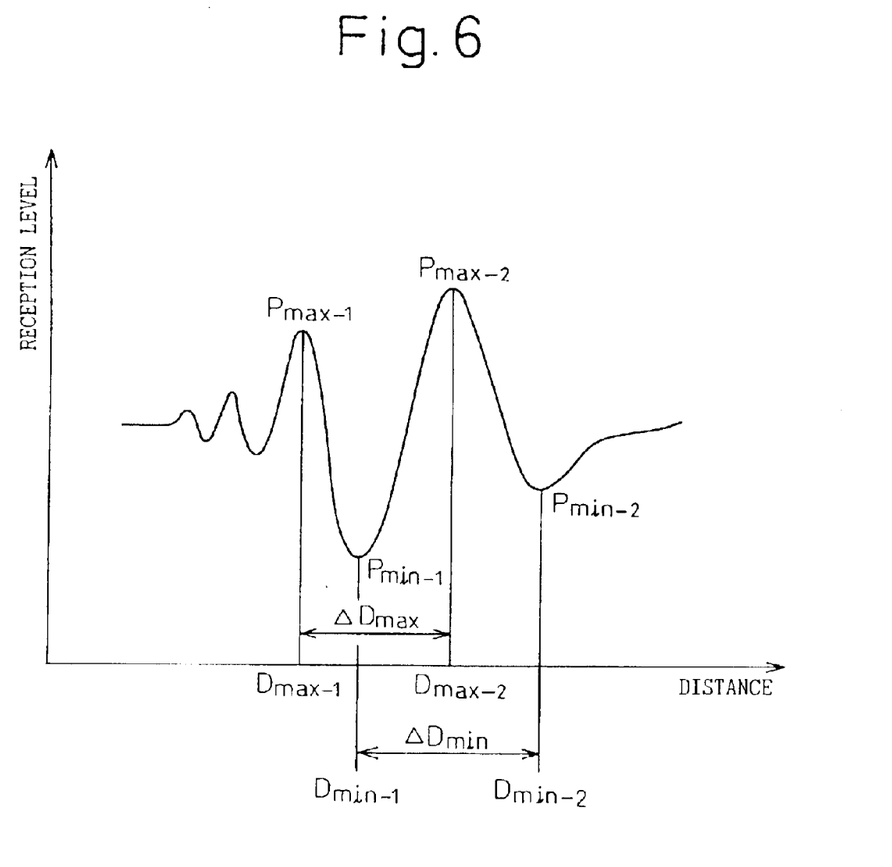
FIG. 6 is a diagram showing the distance between maximum points or between minimum points.

As shown in FIG. 6, when the reception level exhibits a plurality of maximum points or minimum points, the distance ΔDmax between the maximum points Pmax-1 and Pmax-2 or the distance ΔDmin between the minimum points Pmin-1 and Pmin-2 is obtained, and when the distance is smaller than a predetermined value (threshold value), that is, when $$\Delta D\text{max} < \Delta D \text{ or } \Delta D\text{min} < \Delta D$$

it is determined that the fluctuation of the level is large, and therefore that the detected stationary object is a large stationary on-road object.

The occurrence of multipath reflection depends on the distance between the vehicle and the stationary object, and multipath reflections occur most often at a particular distance. As a result, if the size of the stationary object is the same, when the vehicle is at a particular distance from the stationary object, multipath reflections occur most often, and at other distances, multipath reflections occur less often. Accordingly, if the size of the stationary object is the same, the magnitude of the fluctuation of the reception level changes with the distance between the vehicle and the stationary target. In view of this, in the present invention, the threshold value (ΔP) for the above difference is varied in accordance with the distance between the vehicle and the stationary target.

Figure 7:
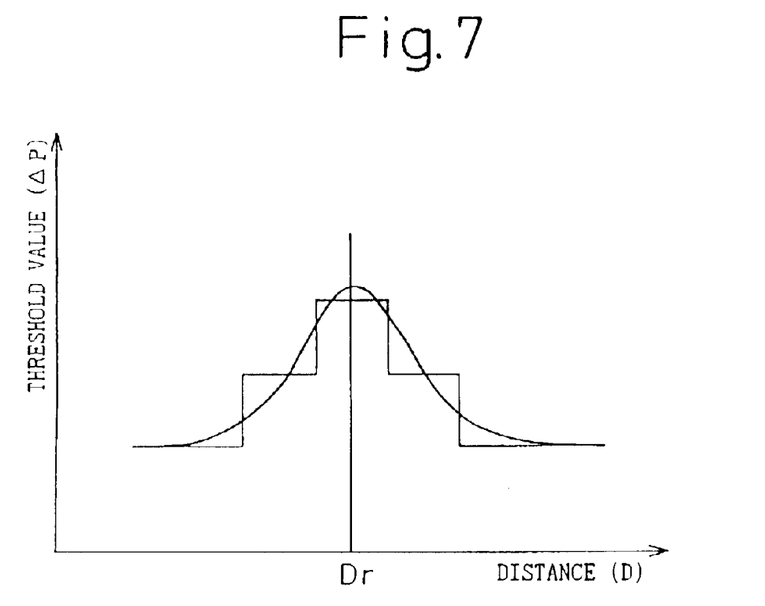
FIG. 7 is a diagram showing how a threshold value is varied in accordance with the distance.

FIG. 7 is a diagram showing how the threshold value is varied in accordance with the distance. As shown, multipath reflections occur most often at distance Dr, and the reception level fluctuates greatly. In view of this, in the present invention, the threshold value ΔP is set the largest at distance Dr, the value gradually sloping down on both sides of it. As shown, the value may be varied in a steplike shape or in a curved shape.

Further, in the present invention, the threshold value Δ(P/D) for the slope is also varied, in a similar manner, in accordance with the distance between the vehicle and the stationary object.

The reception level shown in the graph of FIG. 5 is obtained by plotting the value of the reception level each time the radar signal is received. The radar signal is received at predetermined intervals of time. According, when receiving the signal while the vehicle is moving, the receiving interval in terms of distance decreases as the relative velocity of the vehicle decreases, and increases as the relative velocity increases.

Figure 8:
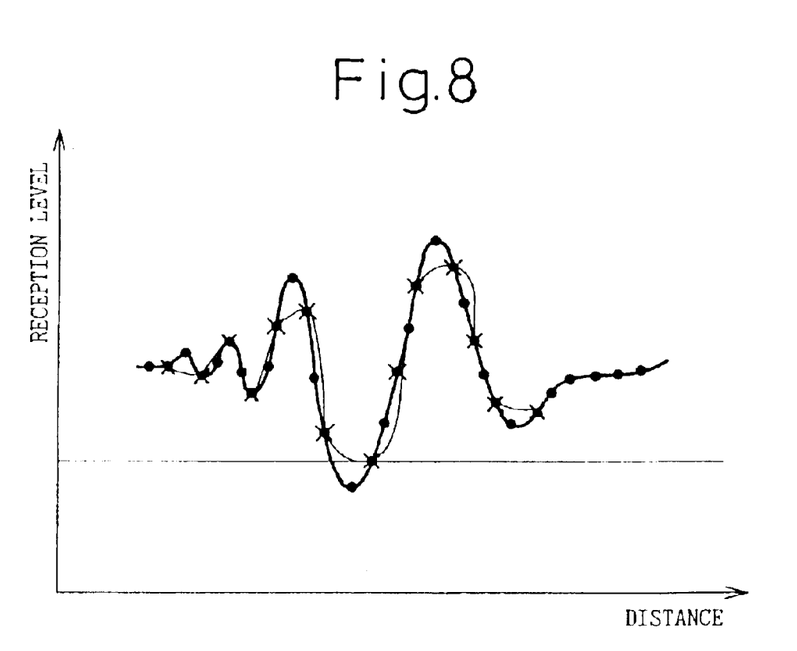
FIG. 8 is a diagram showing how the reception level shown in the graph of FIG. 5 is plotted in accordance with relative velocity.

FIG. 8 shows how the reception level shown in the graph of FIG. 5 is plotted in accordance with the relative velocity. When the relative velocity of the vehicle is low, the timing for signal reception can be taken at many points for a given distance, as shown by "•" in FIG. 8, and thus, Pmax and Pmin can be obtained with relatively high accuracy. On the other hand, when the relative velocity of the vehicle is high, the timing for signal reception cannot be taken at so many points for a given distance, as shown by "x" in FIG. 8; as a result, the values of Pmax and Pmin become smaller than their actual values. In view of this, in the present invention, the value of ΔP is varied in accordance with the relative velocity of the vehicle. That is, as the relative velocity increases, the threshold value (the value of ΔP) is gradually made smaller than when the relative velocity is low.

Figure 9:
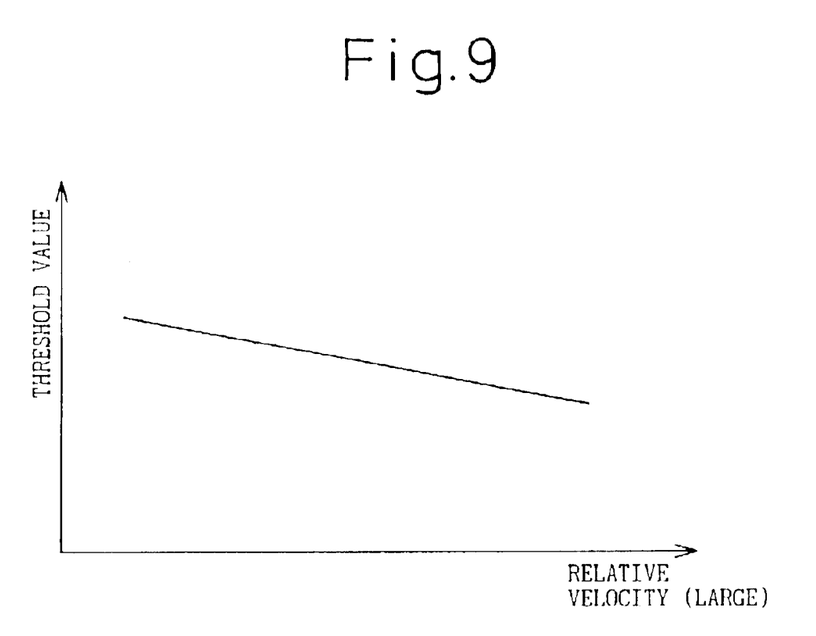
FIG. 9 is a graph showing the relationship between the relative velocity and the threshold value.

Further, in the present invention, the threshold value Δ(P/D) for the slope is also varied in a similar manner in accordance with the relative velocity. That is, as the relative velocity increases, the threshold value (the value of Δ(P/D)) is gradually made smaller than when the relative velocity is low. FIG. 9 is a graph showing the relationship between the relative velocity and the threshold value. As shown, the threshold value is made smaller as the relative velocity increases.

Here, the threshold value is varied in accordance with the relative velocity, but alternatively, the threshold value may be varied in accordance with the actual vehicle speed.

Figure 10:
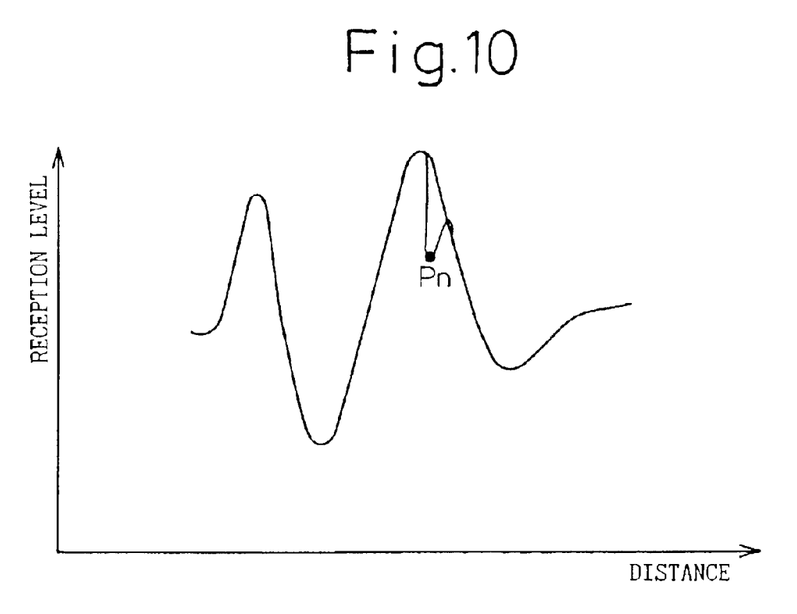
FIG. 10 is a diagram showing how the reception level varies with distance when the received signal contains noise.
Figure 11:
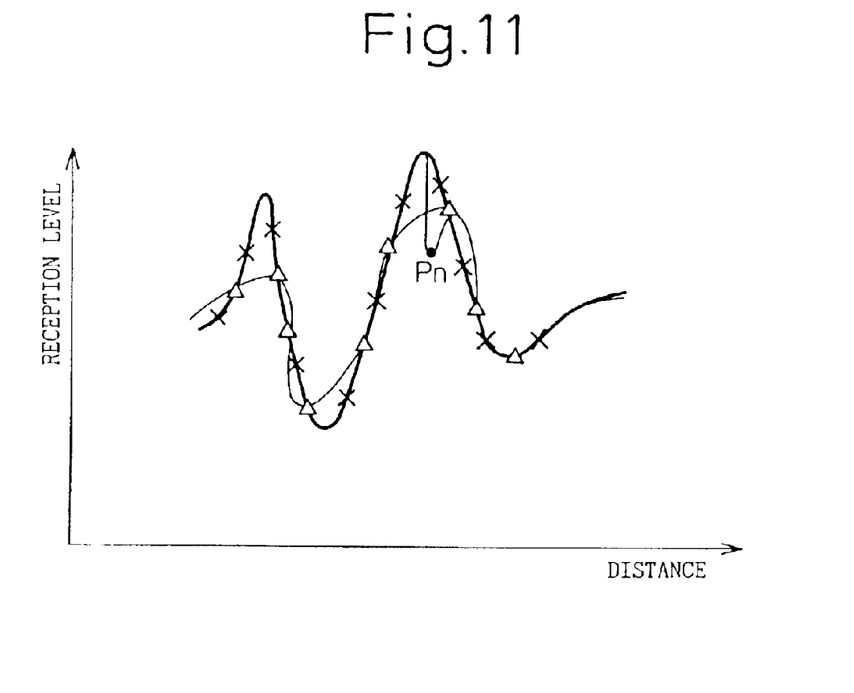
FIG. 11 is a diagram showing the timing for signal reception and the reception level of the received signal when filtering is applied in the graph of FIG. 10.

FIG. 10 is a diagram similar to FIG. 5, showing the variation of the reception level with the distance. The received signal may contain noise, as indicated by Pn in the figure, and a filter is used to remove the noise. FIG. 11 shows the signal reception timing "x" and the reception level of the received signal when filtering is applied in the graph of FIG. 10. As shown in FIG. 11, when filtering is applied, the variation of the signal reception level becomes smaller than the actual variation.

Figure 12:
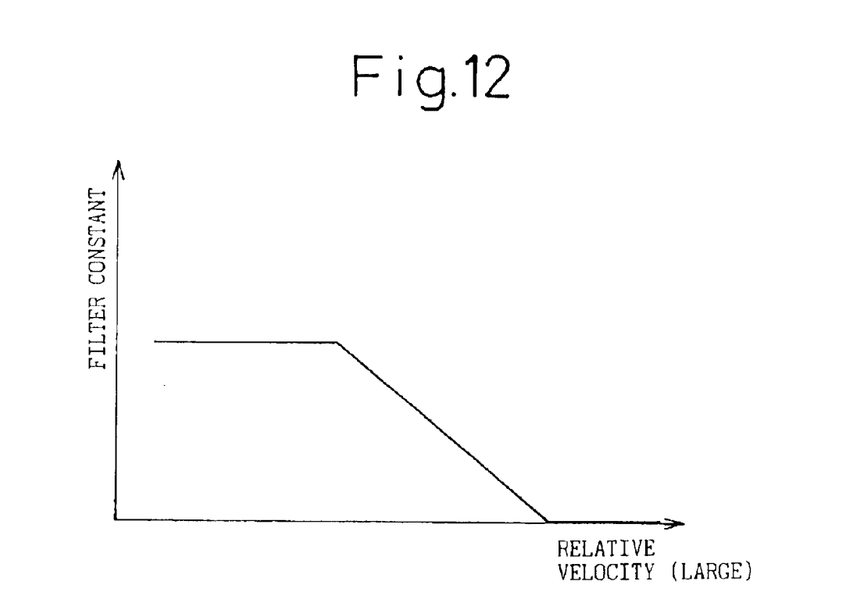
FIG. 12 is a diagram showing how a filter constant is varied in accordance with the relative velocity.

As previously explained with reference to FIG. 8, when the relative velocity is high, a sufficient number of points cannot be taken for signal reception timing, and the values of the maximum point and minimum point become smaller than their actual values. Further, when filtering is applied, as described above, the variation of the signal reception level becomes smaller than the actual variation. In view of this, in the present invention, when applying filtering, filtering is not applied uniformly, but the filter constant is varied in accordance with the relative velocity or the actual vehicle speed. FIG. 12 shows one example of this; that is, the filter constant is maintained at a constant value until the relative velocity exceeds a certain value but, for larger values of the relative velocity, the filter constant is reduced and is set to 0 when the relative velocity reaches another certain value. In this case also, the actual vehicle speed may be used instead of the relative velocity.

Figure 13:
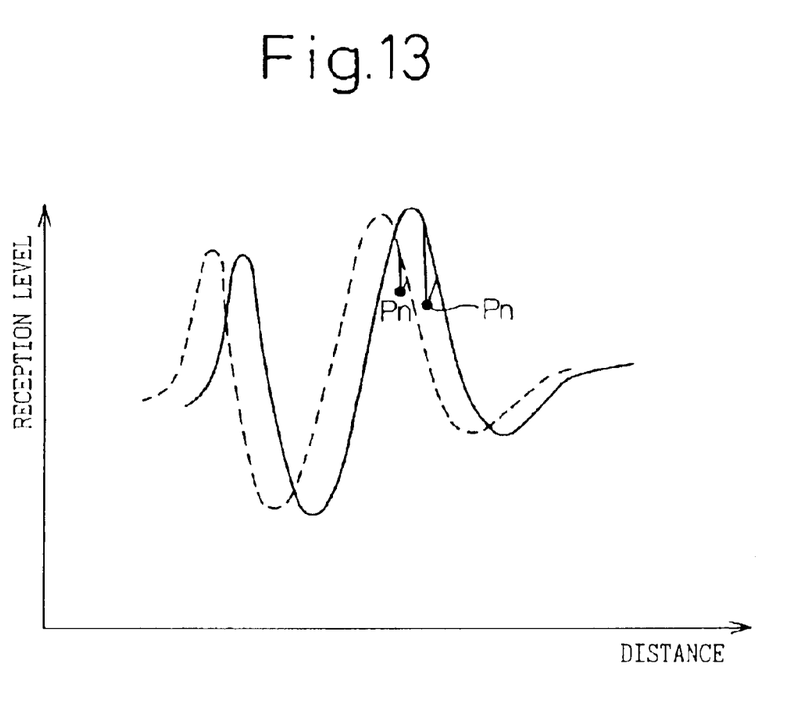
FIG. 13 is a graph showing how the reception level of a noise-containing signal varies with the distance when the filter constant is varied in accordance with vehicle speed.

FIG. 13 is a graph showing how the reception level varies with the distance when the filter constant is varied in accordance with the vehicle speed as in the present invention. The solid line shows the reception level containing noise, and the dashed line shows the reception level after filtering. As shown in FIG. 13, the effect of noise can be reduced without causing an appreciable change in the signal reception level.

Figure 14A:
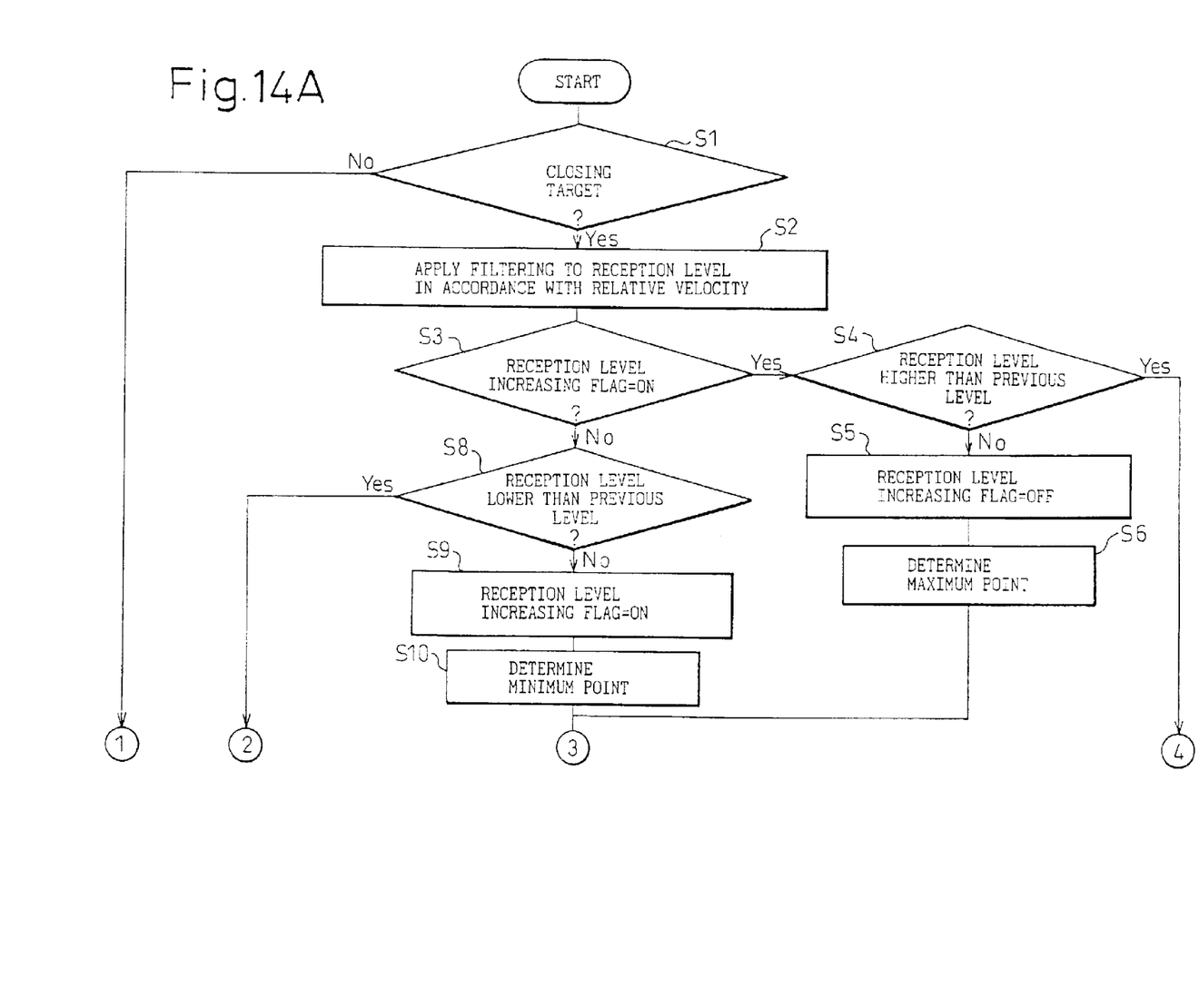
FIGS. 14A and 14B are a flowchart showing an embodiment of the method of the present invention.
Figure 14B:
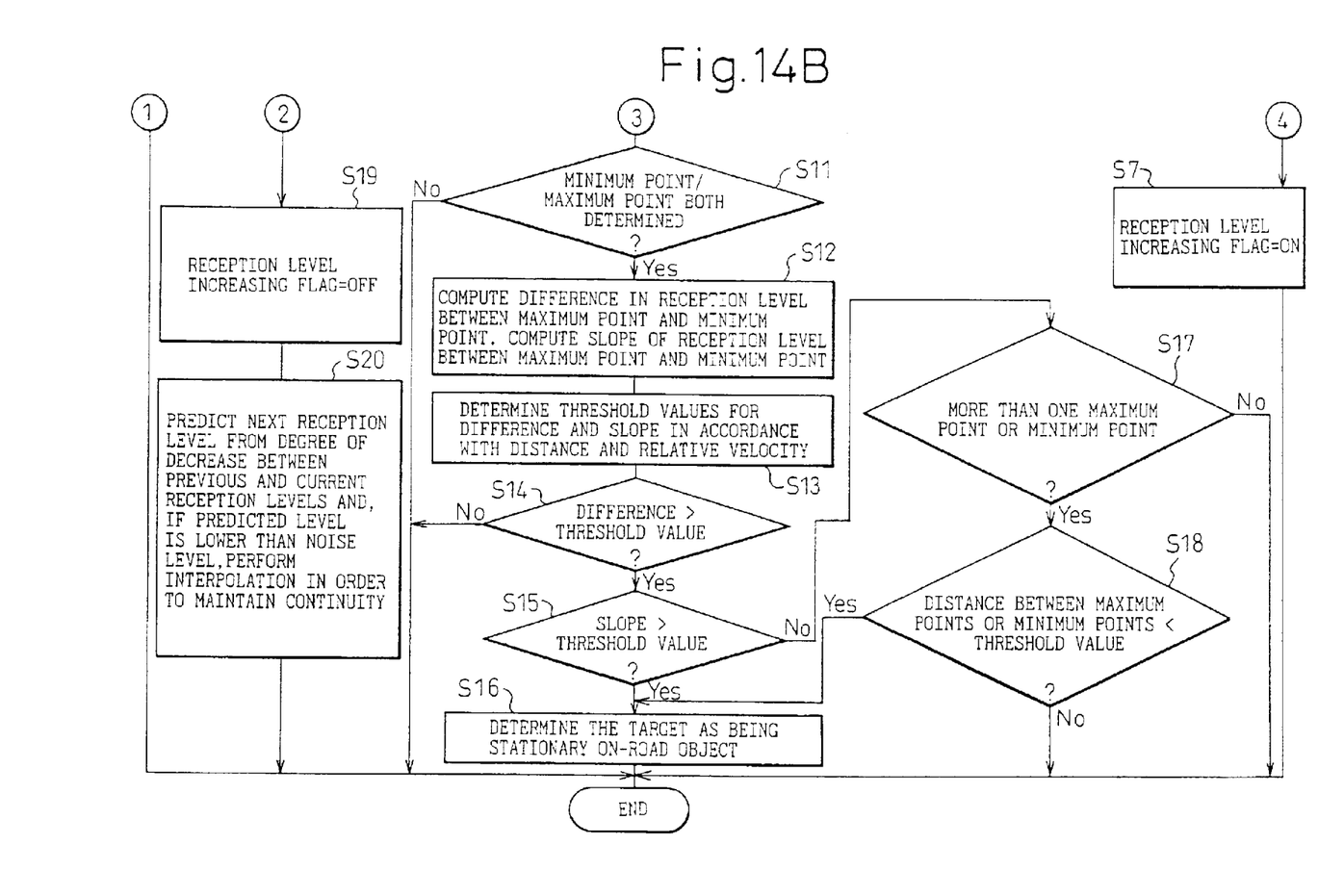

FIGS. 14A and 14B are a flowchart showing an embodiment of the method of the present invention. In the flowchart, the decision in each decision step is made in the signal processing circuit 3 of FIG. 1.

First, in S1, it is determined whether the target is a closing target or not. If it is a closing target, it can be considered as a stationary object; therefore, in S2, filtering is applied to the reception level in accordance with the relative velocity or the actual vehicle speed. As previously described, when the relative velocity of the vehicle is high, the difference between the maximum and minimum points, etc. decrease. Therefore, filtering is applied to the reception level as shown, for example, in FIG. 12.

Next, in S3, a reception level increasing flag is checked to see whether the flag is set or not. If the flag is set (Yes), it is determined in S4 whether the reception level is higher than the previous reception level. If the reception level is not higher than the previous level (No), the reception level increasing flag is reset in S5 and, as this means that the reception level has changed from increasing to decreasing, the reception level at this point in time is determined as being a maximum point (S6). On the other hand, if it is determined in S4 that the reception level is higher, this means that the reception level is increasing continuously, so that the reception level increasing flag is set (S7), after which the flow for this cycle of processing is terminated.

If, in S3, the reception level increasing flag is not set (No), the process proceeds to S8 to determine whether the reception level is lower than the previous reception level. If the answer is No, that is, if the reception level is not lower than the previous level, then the reception level increasing flag is set (S9) and, as this means that the reception level has changed from decreasing to increasing, the reception level at this point in time is determined as being a minimum point (S10). Then, it is determined whether both the maximum point and the minimum point have been determined (S11). If both the maximum point and the minimum point have been determined (Yes), the difference in reception level between the maximum point and the minimum point and the slope of the change of the reception level over the distance are computed in S12. Then, the threshold values for the difference and the slope are determined in accordance with the distance and the relative velocity of the target (S13). Here, for the distance, the threshold values for the difference and the slope are varied as shown in the graph of FIG. 7. On the other hand, for the relative velocity, the threshold values for the difference and the slope are varied as shown in the graph of FIG. 9. In this case, the actual vehicle speed may be used instead of the relative velocity, as previously described.

Next, in S14, it is determined whether the difference is larger than the threshold value. If it is larger (Yes), then it is determined whether the slope over the distance between the maximum point and the minimum point is greater than the threshold value (S15). If the answer is Yes, it is determined that the detected target is a stationary on-road object, that is, the kind of on-road object that the vehicle cannot pass over (S16). Alternatively, the detected target may be determined as being a stationary on-road object when it is determined in S14 that the difference is larger than the threshold value. If the answer in S15 is No, that is, if the difference is larger than the threshold value, but the slope is not greater than the threshold value, then it is determined whether there is more than one maximum point or minimum point (S17). If the answer is Yes, it is determined whether the distance between the maximum points or between the minimum points is smaller than the threshold value (S18). If the answer is Yes, then it is determined that the detected target is a stationary on-road object (S16). If the answer is No in S17 or S18, the process is terminated without determining whether the detected target is a stationary on-road object or not. Alternatively, the determination whether the detected target is a stationary on-road object or not may be made based only on the decision in S18, that is, by only checking whether the distance between the maximum points or between the minimum points is smaller than the threshold value.

If the answer in S8 is Yes, that is, if the reception level is lower than the previous reception level, the reception level increasing flag is reset (S19); then, the next reception level is predicted from the degree of decrease between the previous and current reception levels, and if the predicted level is lower than the noise level, interpolation is performed so as to maintain continuity (S20). Here, the interpolation is made in order to maintain the continuity of target data, because if the reception level becomes lower and the signal is buried in noise, the target data would be lost. After the interpolation is made, the process is terminated without determining whether the detected target is a stationary on-road object or not.

What is claimed is:

1. A stationary on-road object detection method for a radar, wherein a fluctuation in the reception level of a reflected wave from a target is obtained in relation to the distance of said target, a maximum point and a minimum point are obtained from the fluctuation of said reception level, it is determined whether there is more than one maximum point or minimum point, and if there is more than one maximum point or minimum point, the distance between said maximum points or between said minimum points is obtained, and wherein when said obtained distance is smaller than a predetermined threshold value, it is determined that said target is a stationary on-road object.

2. A stationary on-road object detection method for a radar, as
   wherein a fluctuation in the reception level of a reflected wave from a target is obtained in relation to the distance of said target, a maximum point and a minimum point are obtained from the fluctuation of said reception level, and a difference in reception level between said maximum point and said minimum point is obtained;
   wherein when said obtained difference is larger than a predetermined threshold value and the slope over the distance between said maximum point and said minimum point is not greater than a predetermined threshold value, then it is determined whether there is more than one maximum points or minimum points, and if there is more than one maximum point or minimum point, the distance between said maximum points or between said minimum points is obtained; and
   wherein when said obtained distance is smaller than a predetermined threshold value, it is determined that said target is a stationary on-road object.

3. A stationary on-road object detection method for a radar as claimed in claim 1 or 2, wherein, for said reception level, a filter constant is varied in accordance with relative velocity or actual vehicle speed.

* * * * *